Figure 1:
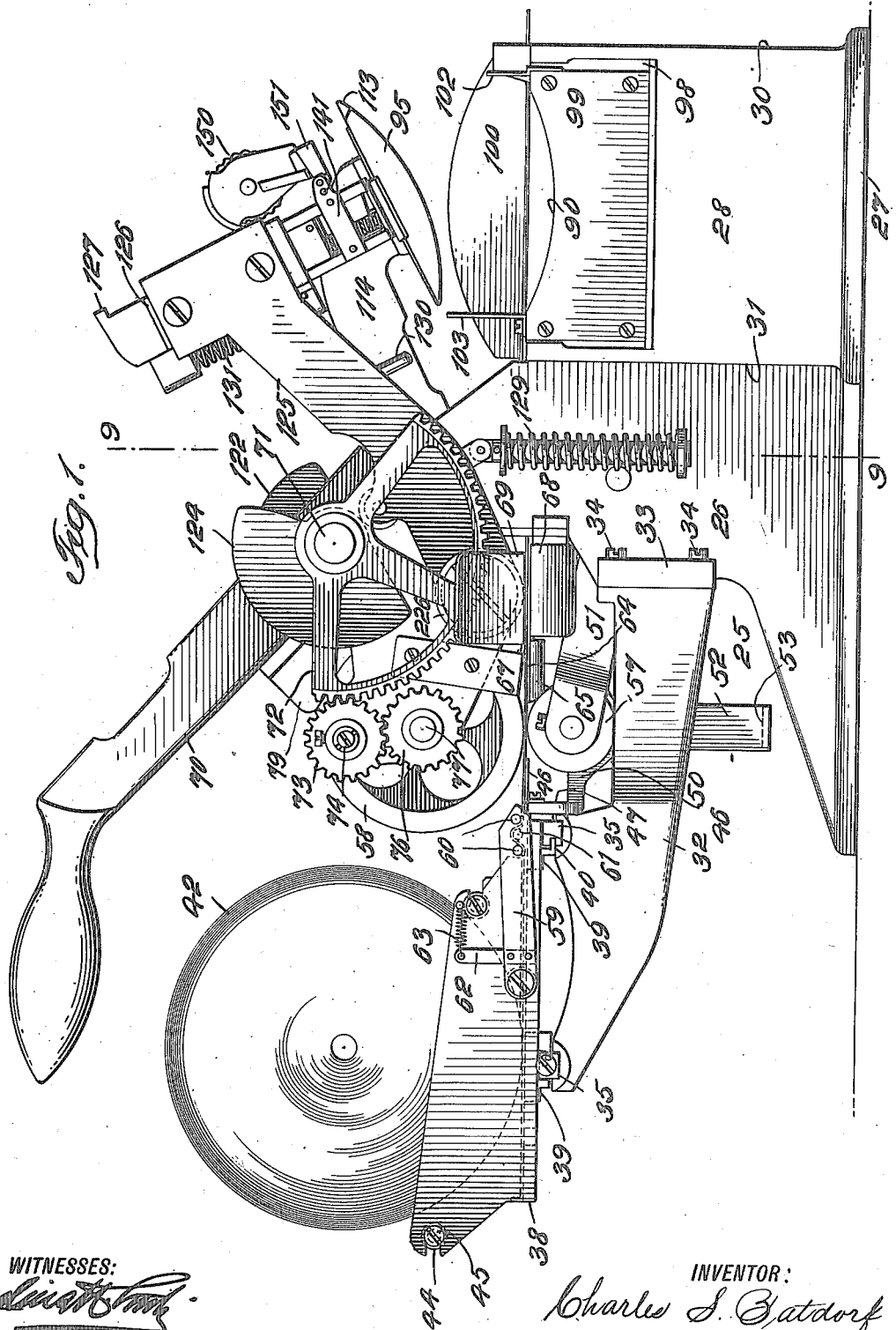

C. S. BATDORF.
MACHINE FOR BANDING BILLS AND THE LIKE.
APPLICATION FILED APR. 23, 1915.

1,190,848.

Patented July 11, 1916.
9 SHEETS—SHEET 1.

WITNESSES:

INVENTOR:
Charles S. Batdorf
BY
Charles C. Gill
ATTORNEY.

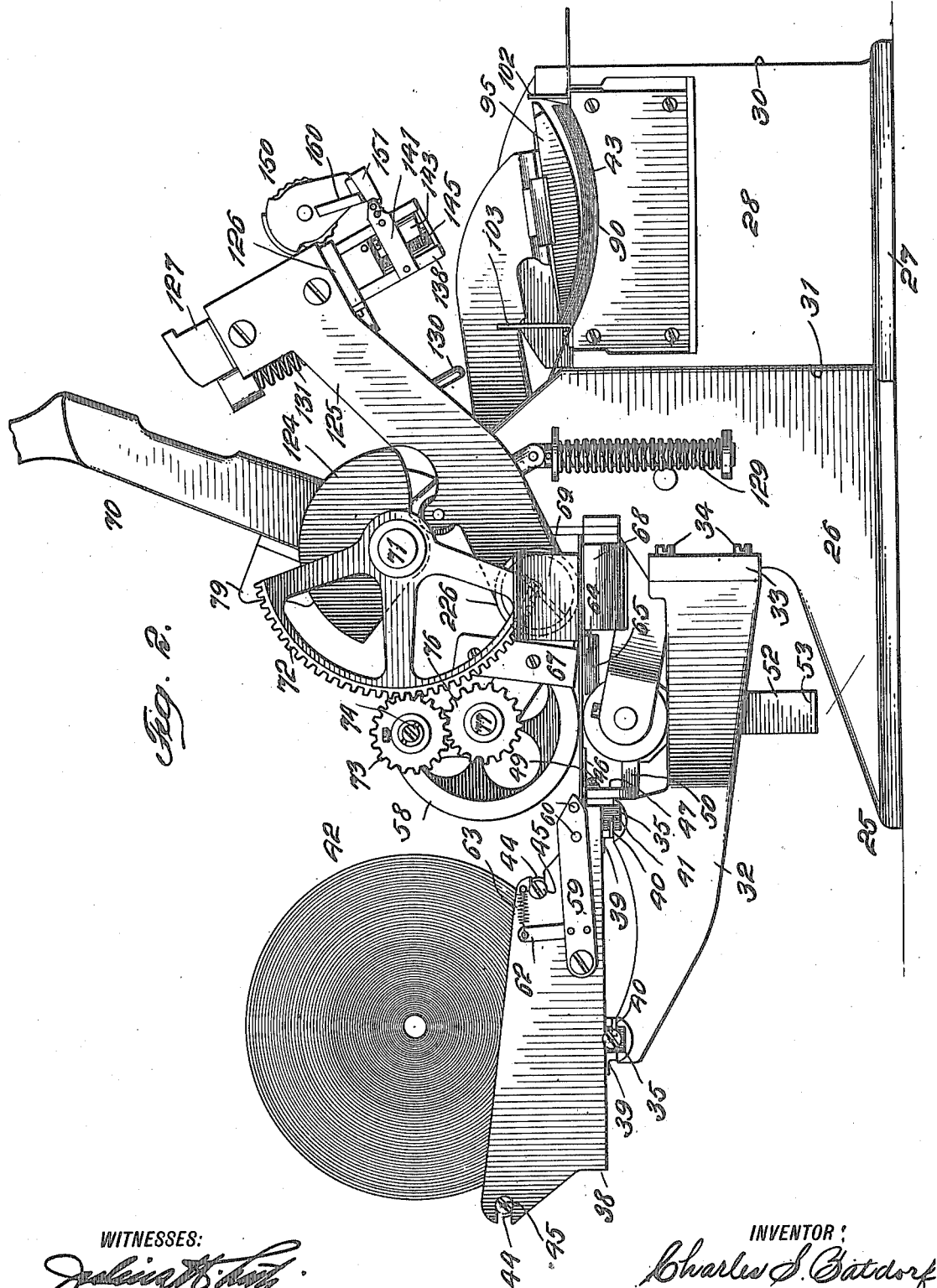

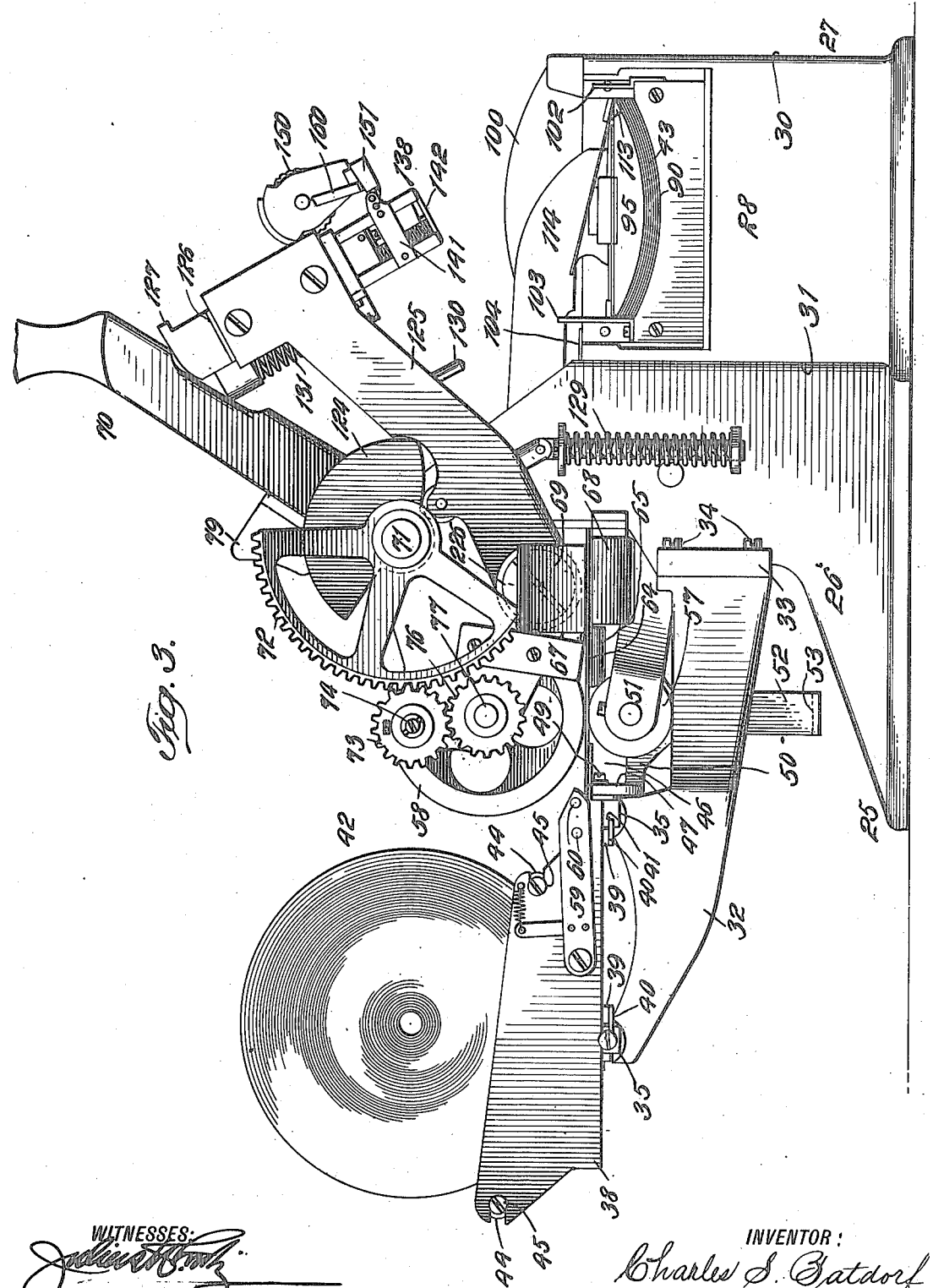

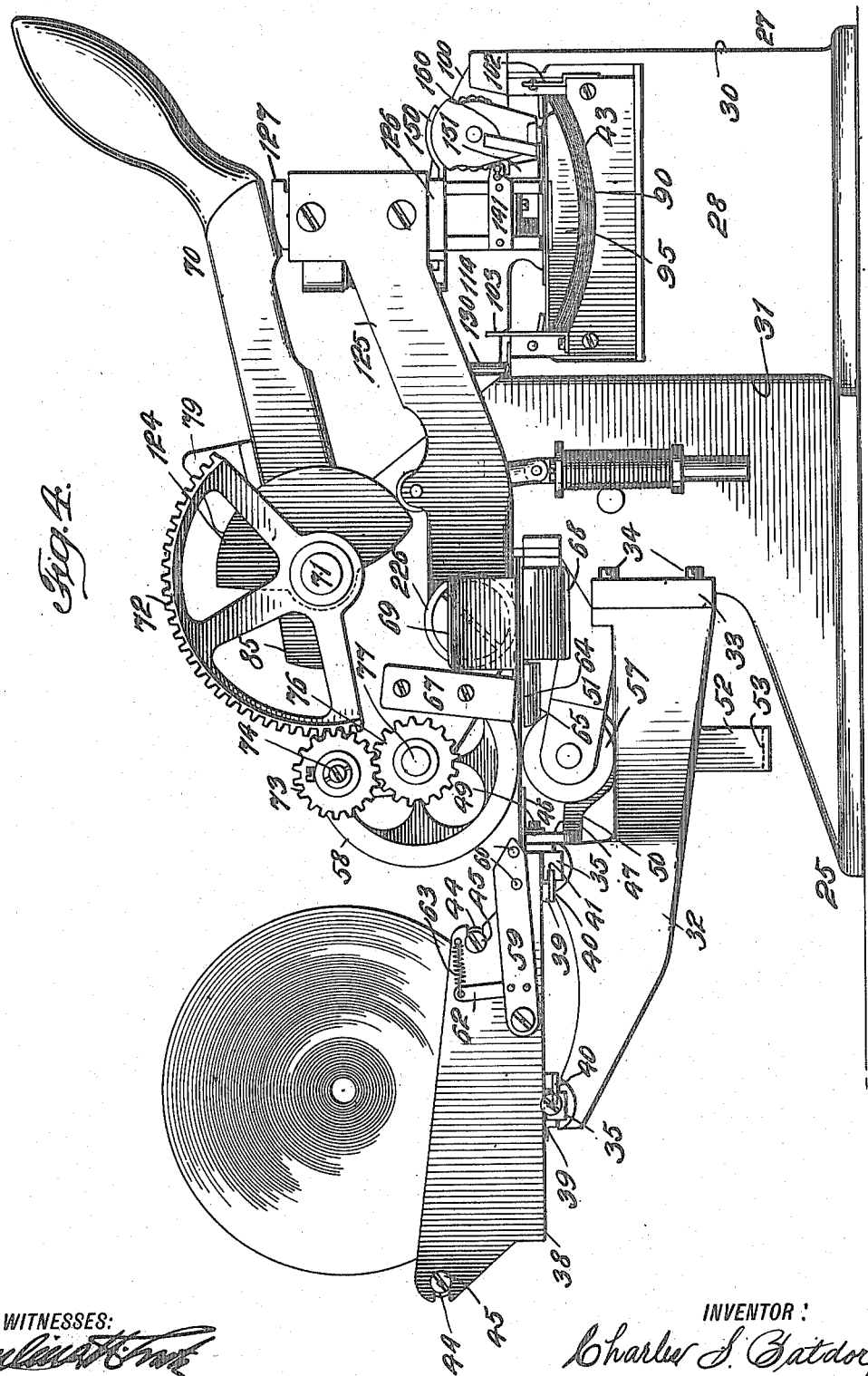

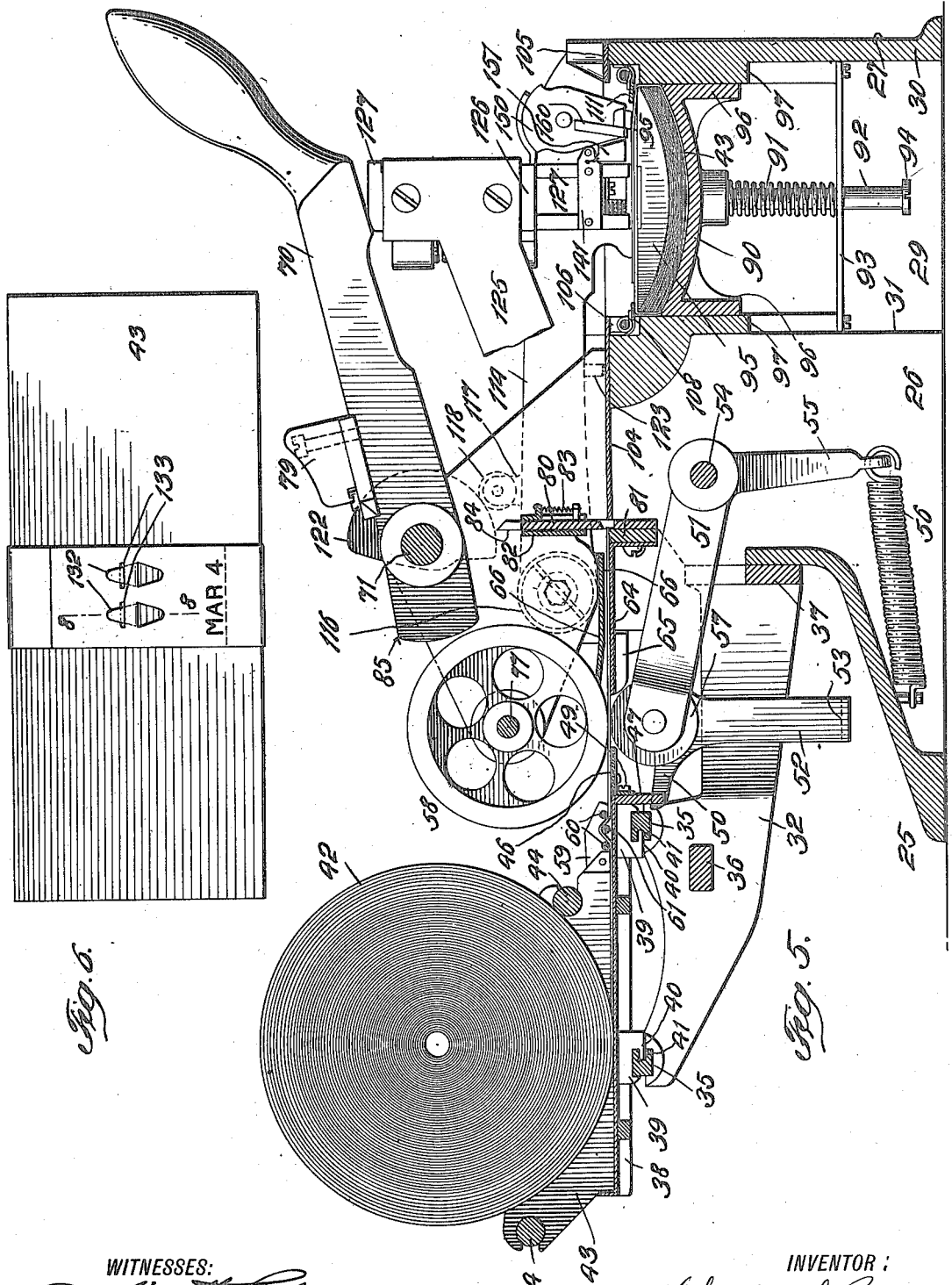

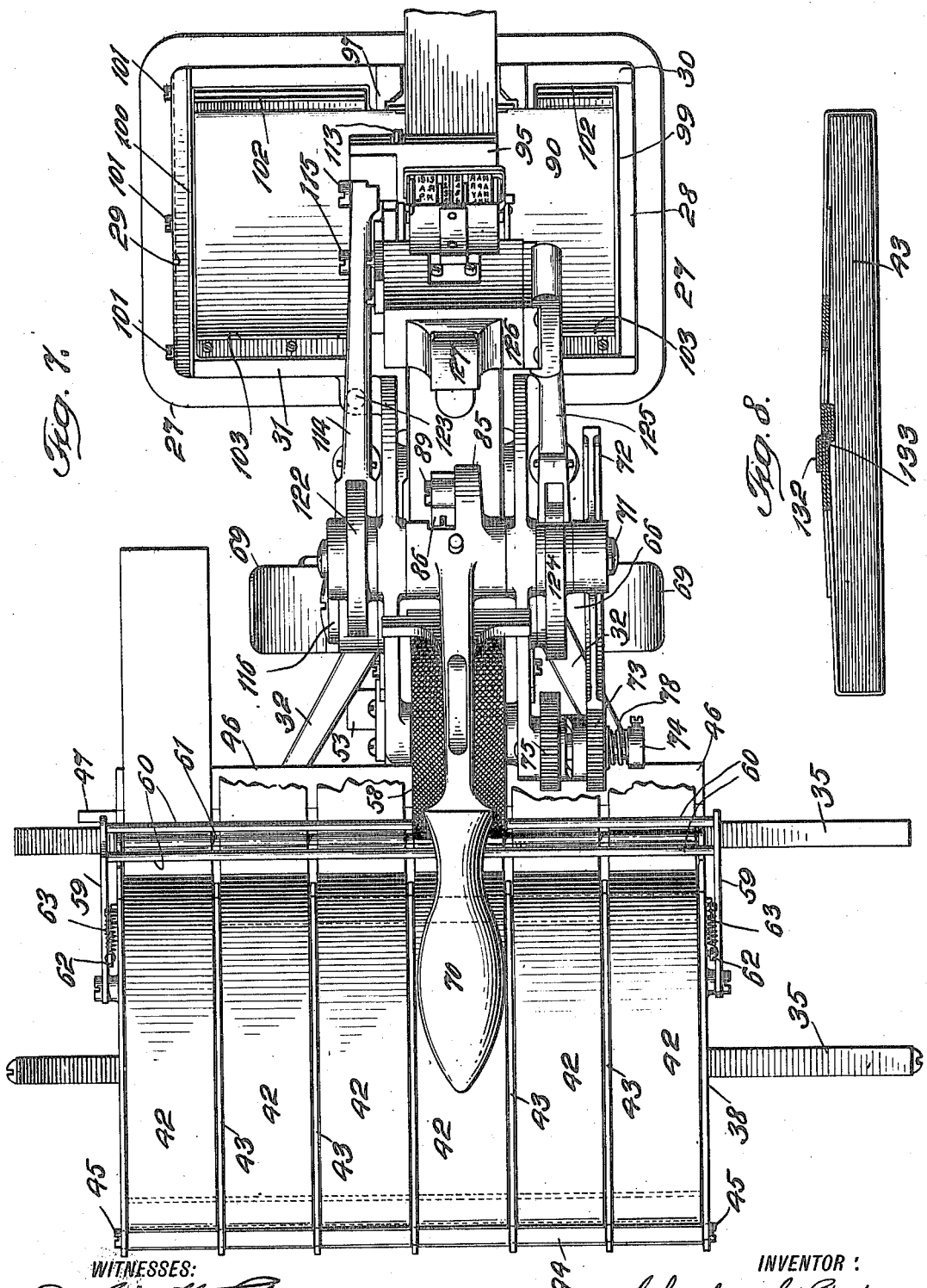

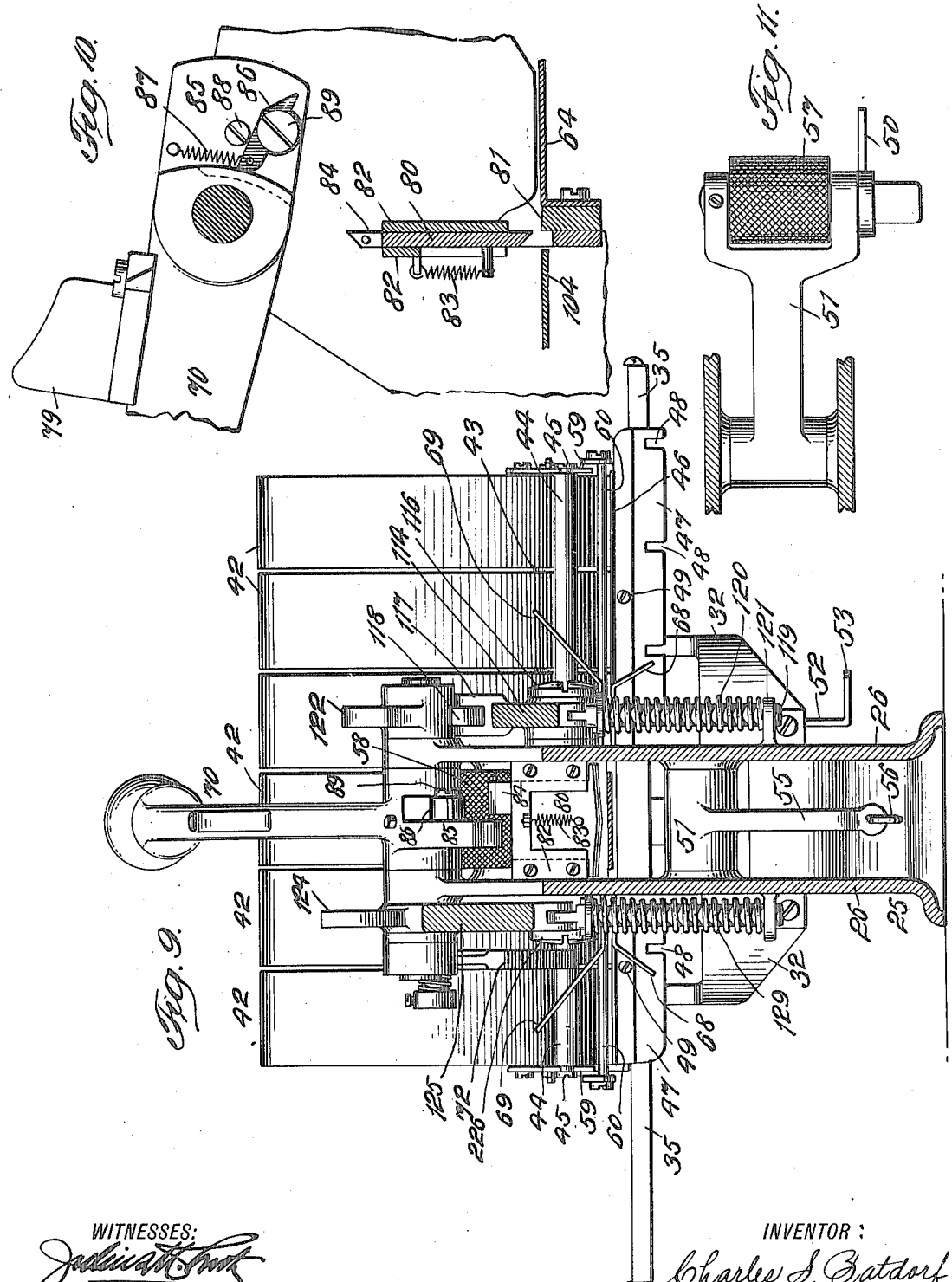

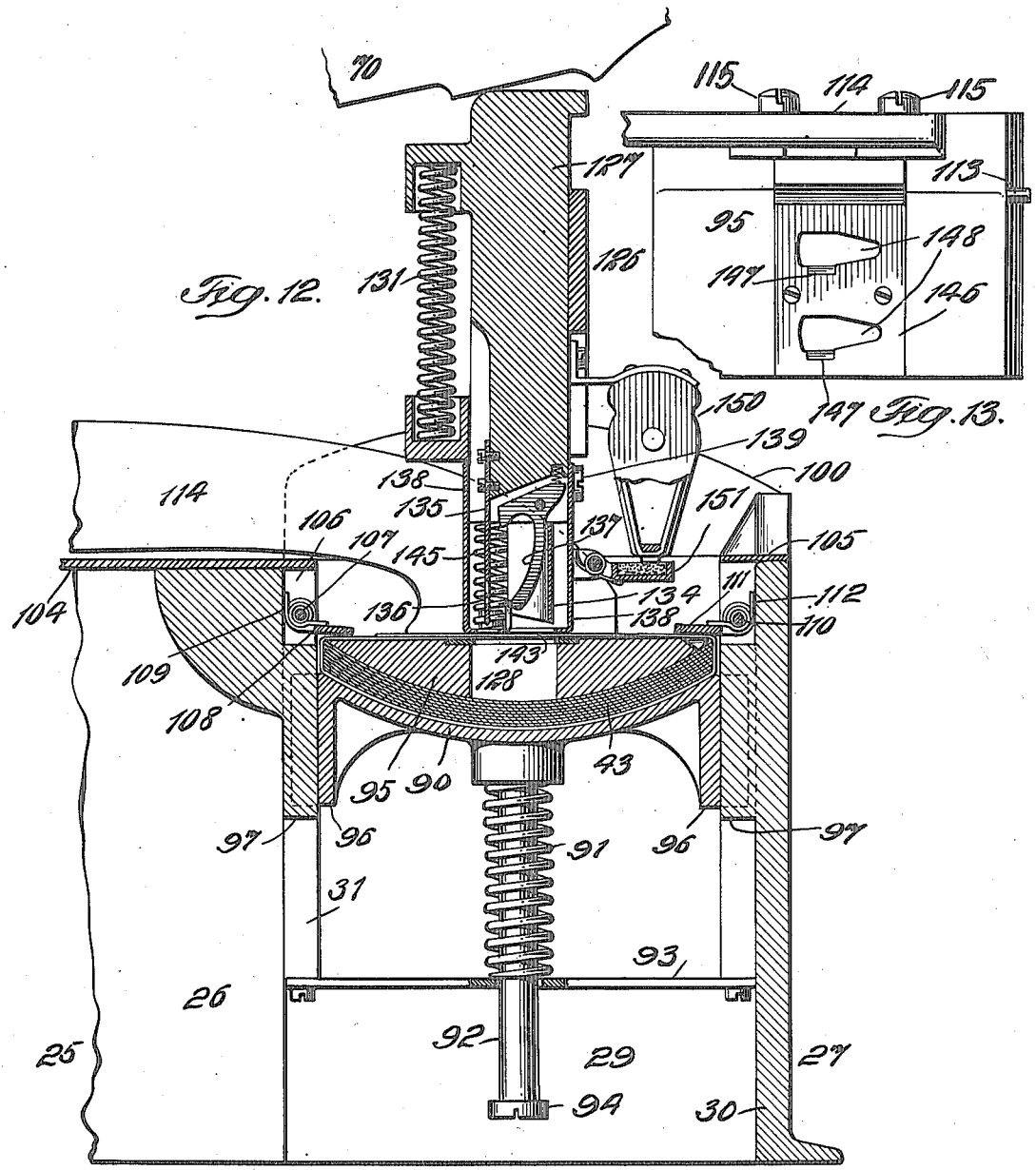

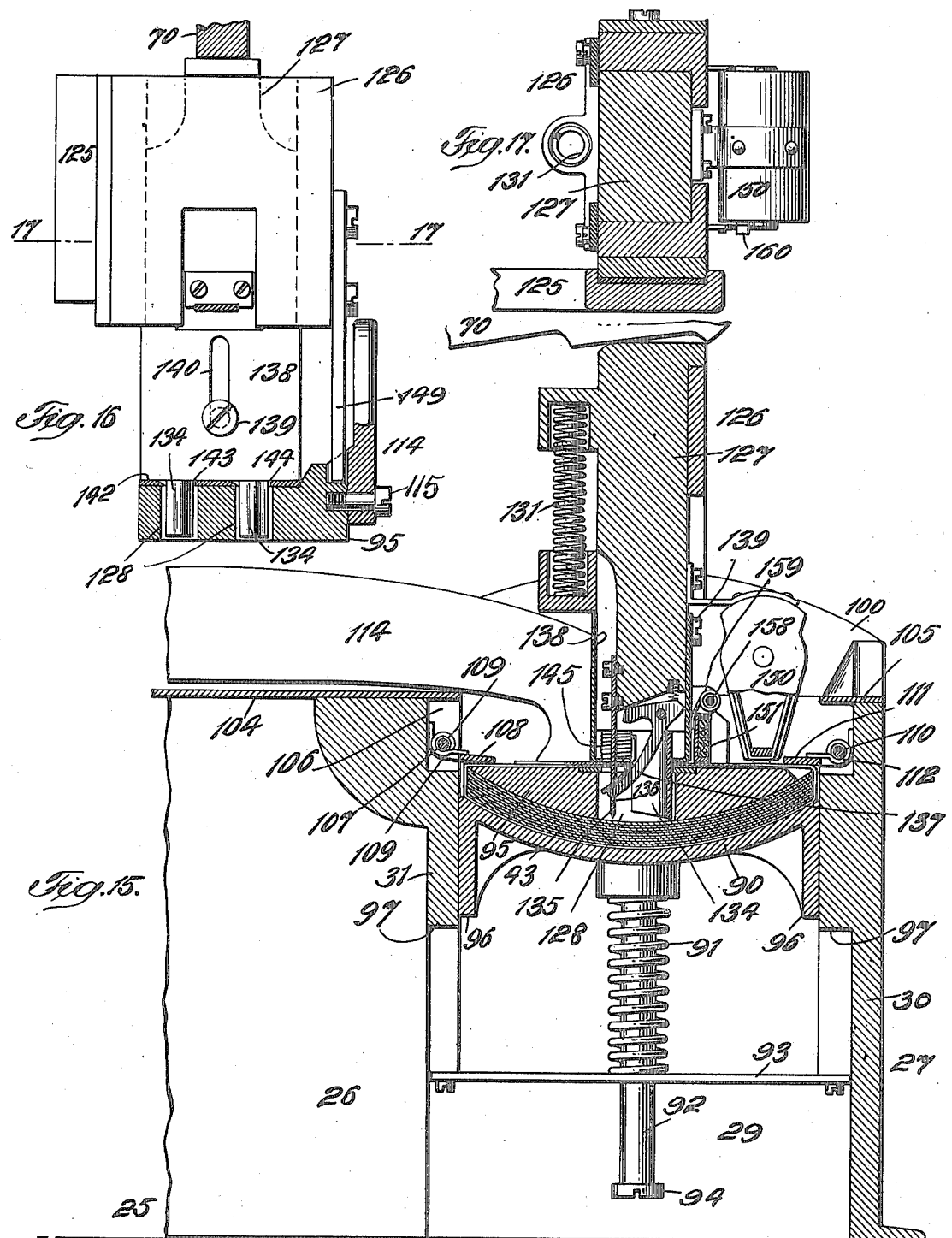

UNITED STATES PATENT OFFICE.

CHARLES S. BATDORF, OF BROOKLYN, NEW YORK.

MACHINE FOR BANDING BILLS AND THE LIKE.

1,190,848. Specification of Letters Patent. Patented July 11, 1916.

Application filed April 23, 1915. Serial No. 23,293.

*To all whom it may concern:*

Be it known that I, CHARLES S. BATDORF, a citizen of the United States, and a resident of Brooklyn, in the county of Kings and State of New York, have invented certain new and useful Improvements in Machines for Banding Bills and the like, of which the following is a specification.

The invention relates more particularly to the banding of bundles of bills in banking houses and the like. It is well known that in banks and other places handling large amounts of money, bills of the same denomination are placed in bundles each containing a specified number of bills and that these bundles are banded by means of a strip of paper drawn transversely around each bundle and having its ends pinned together and to the outer bills of the bundles. The total value of the bills in the bundle are indicated by a notation placed on the band. It is customary, for instance, with respect to one dollar bills to place one hundred of the bills in a bundle and then apply the band to the bundle. Various schemes have been devised for the manual banding of bundles of bills, but the system commonly employed is to apply a strip of paper transversely around a bundle and pin its overlapping ends together and to the upper bills of the bundle, all this work being performed by hand.

My invention comprises a machine by means of which the bundles of bills may be rapidly and effectually banded without the use of pins and the like, my machine comprising means for feeding the required length of paper strip for a band from a reel, severing said length from the main body of the strip, wrapping said length of paper around a bundle of bills, with the ends of the length of strip overlapped, securing the overlapping ends of the strip of paper upon the bundle of bills, preferably by cutting tongues and slits in the overlapping ends of the length of paper and tucking the tongues into the slits for securing said overlapping ends together, and placing a date on the band indicating the date on which the bundle was banded. The reel of paper will have printed on it at predetermined intervals a notation of the amount of money in each bundle banded.

The machine of my invention will preferably comprise a shiftable carriage holding a number of reels of paper varying in color, the whole arranged so that any specified color of paper may be used on bundles of bills of the same denomination, the color being an indication when so employed of the denomination of the bills in the bundle or package.

The machine of my invention comprises means for feeding the paper from the reel between cutters and across a yielding bed and the bundle of bills to be banded will be placed upon this bed above the length of paper and thereupon the actuating means will be set in motion with the result that the requisite length of paper will be severed from the main body of the strip and a presser or platen caused to descend upon the bills and by depressing the bills and yielding bed release folders to effect the folding of the ends of the strip upon the top of the presser or platen with one end of the strip overlapping the other preparatory in the further operation of the machine of the punch mechanism acting to secure the overlapping ends of the strip of the length of paper together and thus bind the bills to the platen or presser. Upon the elevation of the platen or presser carrying the bundle of bills, another length of the strip of paper for a subsequent bundle will be fed across the yielding bed-plate and the attendant will slip the bundle and band carried by the presser or platen laterally therefrom and said bundle having been pressed into longitudinal concave or trough shape by the bed and platen or presser, he will flatten out the bundle, the operation then being completed. The flattening out of the bundle of bills results in the bills taking up that portion of the length of the band which extended over the upper side of the platen or presser, thereby leaving the bundle flat and with the band snugly secured thereto.

The machine of my invention has been designed more particularly for the rapid and convenient banding of bundles of banknotes, bills or paper money in banks and other establishments handling bills in large quantities, but these bills are in effect strips of paper or other flexible material of substantially uniform dimensions and the strips might represent notes, checks, invoices or other documents capable of being banded by my machine, and therefore I employ the term "bills" herein in a generic sense, not desiring to confine the invention to the banding of paper-money as distinguished from banding bundles of strips of other character.

The invention will be fully understood from the detailed description hereinafter presented, reference being had to the accompanying drawings, in which:

Figure 1 is a side elevation of a machine constructed in accordance with and embodying my invention, the platen or presser being shown in its elevated position and a strip of banding paper being illustrated as extending across the bed-plate to receive thereon a bundle of bills, the end of the strip of paper being shown as broken away due to lack of space on the sheet; Fig. 2 is a like view, partly broken away, of the same, with the platen or presser in a partly depressed position against a bundle of bills to be banded by a definite length of the strip of paper, the proper length for the band having, in the operation of the machine, been severed from the main strip by the time the platen reaches the position shown in Fig. 2; Fig. 3 is a further side elevation of the machine showing the platen or presser as having been further depressed and the operating handle therefor engaging the upper end of the punch-plunger; Fig. 4 is a further side elevation of the machine showing the platen, punch-plunger and operating handle in their completely operated position; Fig. 5 is a vertical longitudinal section through the machine with its parts in the position illustrated in Fig. 4; Fig. 6 is a top view of a bundle of bills banded and dated by the machine of my invention; Fig. 7 is a top view of the machine of my invention with the strips of paper shown as partly broken away and the operating handle and movable parts of the machine in their initial position, which is the position of the parts of the machine illustrated in Fig. 1; Fig. 8 is an enlarged end view of a bundle of bills banded in accordance with my invention, the band being shown as partly in section about on the dotted line 8—8 of Fig. 6; Fig. 9 is a vertical transverse section through the machine, taken about on the dotted line 9—9 of Fig. 1; Fig. 10 is a vertical longitudinal section through a portion of the machine and is presented to illustrate a part of the feed-table for the strip of banding paper and the means for severing a definite length of the strip preparatory to said length being wrapped and fastened around a bundle of bills; Fig. 11 is a top view, partly in section, of a portion of the machine, this figure being presented to illustrate more clearly the lower feed-roller for the banding paper; Fig. 12 is an enlarged longitudinal section through a portion of the machine with the parts shown in about the position they occupy just before the punch-plunger descends to secure the overlapping ends of the banding strip together, the punch-plunger being shown as holding the cutters or punchers in close relation to the overlapping ends of the band, but not in its completely depressed position; Fig. 13 is a detached top view, partly broken away, of the platen or presser which in the use of the machine is depressed upon the bundle of bills and presses said bundle into the shape illustrated in Fig. 12, a portion of the arm carrying said platen also being illustrated in Fig. 13; Fig. 14 is a bottom view of the frame of the punch and dating mechanism; Fig. 15 is a vertical longitudinal section, partly broken away, corresponding with Fig. 12, but illustrating the punch-plunger in its extreme lower position and as having driven the punches or cutters through the overlapping ends of the band transversely inclosing the bundle of bills and the platen. Fig. 16 is a front view, partly in section, of a portion of the machine, the dating devices being removed and the platen being shown in transverse section so as to illustrate the presence of the depressed cutting punches within the vertical openings formed therein to receive the same, one of said punches being shown in vertical section in Fig. 15, and the punches being shown in front elevation in Fig. 16, and Fig. 17 is a horizontal section, partly broken away, through the same portion of the machine, taken on the dotted line 17—17 of Fig. 16.

In the drawings, 25 designates the general supporting frame of the machine, this frame comprising, by preference, integrally opposite sides 26 and a forward rectangular box-like section 27 which projects laterally beyond the sides 26, as shown in Fig. 7, and has side walls 28, 29, a front wall 30 and a rear wall 31, the latter being open between the sides 26 of the general frame and integral therewith.

The general frame of the machine also comprises two rearwardly diverging arms 32 which are fastened to lugs 33 formed on the sides 26 by means of screws 34, and said arms 32 have secured upon them tramway or track rails 35 and are connected by a strengthening transverse rod 36; the arms 32 are connected at their forward ends integrally by a transverse end piece 37 (Fig. 5). The arms 32 support the track rails 35, and upon these rails I mount a carriage 38 having secured to its underside lugs 39 which partly encompass the rails 35 and are formed with horizontal ribs 40, which enter longitudinal grooves 41 in the sides of said rails. The carriage 38 is adapted to be adjusted along the rails 35 and is guided in such adjustment by the engagement of the lugs 39 with the rails and also by the presence of the ribs 40 in the grooves 41. The ribs 40 and grooves 41 also coöperate to prevent the carriage 38 from being lifted or jarred upwardly from the rails 35. I utilize the carriage 38 for carrying the reels 42 of paper used in banding the bundles of bills, and these bills I, for convenience, number 43. I preferably employ on the machine a series of the reels 42, as indicated in Figs. 7 and 9, and preferably these reels will vary in color and be respectively used on bills differing in denomination, one color being for one dollar bills, another for five dollar bills, another for ten dollar bills, and so on. In this way the denomination of the bills when banded may be recognized by the color of the bands around them. I will also print at predetermined intervals on the paper for the reels and prior to the reeling thereof figures to denote the amount of money in each bundle or package, so that after a set of bills has been banded, the total value thereof may appear on the band around them. I shall also as hereinafter explained during the operation of banding each bundle apply upon the band the date on which the bills were banded. The carriage 38 is sub-divided by partitions 43 into compartments adapted to receive the reels 42 (Figs. 5 and 7), said partitions being held at their opposite ends upon rods 44 which extend through recesses in the partitions and are held at their ends by screws 45 extending through the sides of the carriage and entering said rods 44. The carriage 38 has a flat bottom and is connected with a forwardly extending feed table section 46, between the downwardly flanged rear edge of which and the main portion of the carriage is a bar 47 (Fig. 9) provided with a series of recesses 48 in its lower edge. The feed table section 46 and bar 47 are secured together and to the carriage 38 by means of screws 49 which extend through the downwardly flanged edge of the feed table section 46 and bar 47 and enter the forward lugs 39 secured to the bottom of the carriage 38. The recesses 48 in the bar 47 are utilized in connection with a finger 50 (Figs. 5 and 11) for locking the carriage 38 in such position as may be given to it in bringing the proper reel 42 in line with the operative features of the machine. The finger 50 is connected with a pivoted frame 51 which has connected with it a downwardly extending arm 52 having a laterally turned lower end forming a finger-piece 53 (Fig. 9). The frame 51 is pivotally mounted between the sides of the general frame on a rod 54 and has a downwardly extending arm 55 (Figs. 5 and 9) to which a spring 56 is connected. The frame 51 and arm 55 form in effect a bell-crank, and the spring 56 acts to constantly turn the rear end of the frame 51 upwardly, whereby the finger 50 has a normal engagement with the lower edge of the bar 47 and may enter any of the recesses 48 therein for locking the carriage in adjusted position. When it is desired to shift the carriage 38, the operator will press downwardly on the finger-piece 53 so as to overcome the force of the spring 56 and cause the rear end of the frame 51 to turn downwardly and carry the finger 50 from engagement with the bar 47, and thereafter, after the carriage 38 has been properly adjusted to bring a reel of the desired color into position for use, the pressure on the finger-piece 53 will be released and the spring 56 will move the frame 51 to carry the finger 50 into locking position. The provision of locking means for the carriage 38 is desirable, since thereby during the employment of the machine any tendency of the carriage to become shifted and carry the proper reel 42 from correct position, is overcome. The frame 51 also carries a lower feed roller 57 having a roughened surface to engage the lower surface of the strip of banding paper and press said strip, under the force of the spring 56, against the upper and larger feed roller 58, as will be hereinafter explained.

The carriage 38 has pivotally secured on its sides forwardly extending arms 59, and these arms carry two rods 60 which normally lie close to without undue binding against the bottom of the forward portion of the carriage, one of said rods 60 being at each side of and parallel with a stationary rod 61 secured close to the bottom of the carriage. The pivoted arms 59 have upwardly extending members 62 secured to them and these members at their upper ends are connected with springs 63 fastened to the sides of the carriage and adapted by their tension to turn the forward ends of the arms 59 downwardly and cause thereby the rods 60 to position themselves at opposite sides of the rod 61. The rods 60, 61 are used for tensioning and ironing out the strip of paper as unwound from a reel 42, said strip, as indicated by dotted lines, extending below the rear rod 60 and over the rod 61 and below the front rod 60. The rods 60, 61 take the curl out of the strip of paper and prevent the feed rollers 57, 58 from effecting any undue unreeling of the paper. I do not limit my invention to the use of the springs 63 for keeping the rods 60 in proper relation to the rod 61, since obviously various expedients may be resorted to for accomplishing this purpose or for keeping the rod 61 in proper relation to the rods 60.

Forwardly of the lower feed roller 57 and in line with the feed table section 46 is provided a feed table section 64, whose rear portion has its lateral edges curved downwardly to a slight extent, as at 65, so as to facilitate the lateral movement of a strip of paper between said table section and an upper plate section 66 (Fig. 5), which is reasonably close to the table section 64, but spaced therefrom sufficiently for the travel between said parts 64, 66 of the strip of paper as unwound from a reel 42. The upper plate section 66 is supported from the sides of the general frame by means of the arms 67 integral with said plate section and fastened by screws to said sides, as shown in Figs. 1 and 3. The forward portions of the table section 64 and plate 66 are, at opposite sides of the machine, respectively bent downwardly and upwardly to form diverging lips 68, 69, which form guides for inserting the end of the strip of paper laterally between the feed rollers 57, 58 at a time when the lower feed roller is depressed by pressure applied on the thumb piece 53 in opposition to the force of the spring 56. The carriage 38 is slidable laterally of the machine and a definite length of the paper of each reel projects forwardly of the carriage and when shifting the carriage in either direction to bring any special reel in line with the feed rollers 57, 58, the lower feed roller is depressed and the ends of the strips of paper are, on the movement of the carriage, directed laterally between the feed rollers by means of the guide lips 68, 69. Even should there be only one reel on the carriage, the end of the paper would be drawn from the reel to a certain extent while at one side of the feed rollers and then introduced between the feed rollers by first depressing the lower roller and then sliding the carriage to a position at which it would hold the reel in line with the feed rollers, the end of the strip of paper during this movement of the carriage being passed between the feed rollers and table section 64 and blade 66 by the guide lips 68, 69.

The feed of the strip of paper by means of the rollers 57, 58 is effected from the operating handle or lever 70 during the latter part of the movement of said handle to its rear position, shown in Fig. 1. The handle or lever 70 is pushed forwardly to effect the cutting off of the proper length of strip for a band and the application of said band to a bundle of bills, and then moved rearwardly so that as the banded package or bundle of bills is elevated from its bed the feed rollers 57, 58 may be occupied to feed forwardly a further definite length of the strip of paper drawn from the reel. The feed mechanism intermediate the handle or lever 70 and upper feed roller 58 is probably shown more clearly in Figs. 1, 3 and 7 and comprises a rock-shaft 71 on which said handle or lever 70 is secured, a segment 72 secured on one end of said shaft 71, a gear wheel 73 loosely mounted on a short shaft 74, a gear wheel 75 also mounted on said shaft 74, and a gear wheel 76 secured on the shaft 77 of the upper feed roller 58. The gear wheel 73 is always in mesh with the segment 72 and the gear wheel 75 is always in mesh with the gear wheel 76, but the gear wheels 73, 75 are formed on their facing sides with clutch teeth, as shown in Fig. 7, which permit the wheel 73 to rotate during the forward movement of the handle or lever 70 without communicating its motion to the gear wheel 75, hence there is no movement imparted to the feed rollers during the forward movement of the handle or lever 70 from its position shown in Figs. 1 and 7 to its position shown in Fig. 5, nor is there any feed motion imparted to the feed rollers during the first portion of the return movement of the handle or lever 70 toward its position shown in Figs. 1 and 7, since there then must be a sufficient rotation of the gear wheel 73 to carry its clutch teeth into engagement with the radial flat sides of the clutch teeth of the wheel 75, thus there is no feed of the strip of paper during the first portion of the return movement of the handle or lever 70. As soon however as the clutch teeth on the gear wheels 73, 75 enter into locking engagement, the farther movement of the handle or lever 70 to its initial position results in motion being communicated from the gear wheel 73 to the gear wheel 75 and from the gear wheel 75 to the gear wheel 76 on the shaft of the feed roller 58, with the result that said roller coacting with the roller 57 will effect the forward feed of a definite length of the paper from the reel. Upon the shaft 74 I provide a spring 78 (Fig. 7) which keeps the gear wheel 73 pressed toward the gear wheel 75, but allows the clutch teeth on the side of the gear wheel 73 to slide by the clutch teeth on the side of the gear wheel 75 when said gear wheel 73 is rotated in a direction causing the inclined or slanting faces of the clutch teeth on the wheel 73 to ride against the corresponding faces of the clutch teeth on the wheel 75.

By the time the handle or lever 70 reaches its rear position, shown in Fig. 7, a definite length of the paper from the reel will have been fed forwardly by the feed rollers beyond the cutting means and across the bed on which the bundle of bills 43 is placed for banding, and to prevent any momentum of the feed roller 58 during the rapid use of the machine from unreeling any more than the requisite length of paper, I provide on the back of the lever or handle 70 a brake block 79 which will, upon said lever or handle reaching its rear position, engage the roughened surface of the feed roller 58 and hold the said roller stationary. The block 79 may be made of wood or any material having a binding effect on the roller 58.

The severing of a length of paper for a package of bills takes place after a bundle of bills has been placed upon the already forwardly fed length of paper and during the forward movement of the handle or lever 70 and at about the time said handle is nearly in the position shown in Fig. 2 and just before the platen acts to depress the bundle of bills with the bed or support therefor downwardly into the relation shown in Fig. 15, it being desirable that the length of paper for the band be severed from the strip before the platen acting against the bundle of bills could operate to place the said length under a strain.

The mechanism for severing the length of paper from the main strip for a band is shown more clearly in Figs. 5, 9 and 10, in which 80 denotes a vertically slidable shear-blade or cutter and 81 a stationary shear-bar secured to a downwardly flanged portion of the table section 64. The blade or cutter 80 is mounted in guides 82 and has a small spring 83 connected with it acting to normally hold the blade 80 in its upper position, the upper end of said spring 83 being fastened to a stationary portion of the guides 82, as shown in Fig. 9. The blade 80 has at one side of the center of its upper edge an upwardly extending arm 84 whose upper edge is beveled downwardly and forwardly, as shown in Figs. 5 and 10. The means for depressing the blade 80 to sever a length of the paper are carried by the inner end 85 of the handle or lever 70 and comprise a pivoted dog 86 (Fig. 10), spring 87 connected therewith and stop 88 which limits the movement of said dog in one direction. During the rearward turning movement of the handle or lever 70 the lower end of the dog 86 will move against the upper end of the blade 80, but at this time the spring 87 will yield and the dog 86 will turn on its pivot and pass the upper end of the blade 80 without performing any duty. As soon however as the dog 86 gets by the blade 80 it will regain its normal position with its upper end against the stop 88, and then during the forward movement of the handle or lever 70 the lower beveled end of the dog 86 will, at the proper time, engage the beveled upper edge of the arm 84 of the blade 80 and said dog then being unable to turn from its initial position, the said beveled or inclined surfaces will cooperate to force the blade 80 downwardly and sever the length of paper against the lower member 81 of the cutter. During the rearward movement therefore of the lever or handle 70, the cutter 80 is not actuated, nor does said cutter 80 become depressed during the forward movement of said handle, until the dog 86 is carried in the proper timing of the machine to a point at which it engages with its inclined edge the inclined upper edge of the arm 84 of the blade. 80. The dog 86 is pivotally fastened by means of the screw 89 against the side face of the blade-like lower end 85 of the handle or lever 70.

Within the forward box-like portion 27 of the general frame of the machine is mounted a bed-plate 90 which snugly fits the walls of said box-like portion and is mounted on a spring 91 which acts to normally press the bed 90 to its upper position shown in Fig. 1. The bed 90 has secured to its lower side a rod 92 which extends through the spring 91 and a supporting cross-plate or bar 93 and has on its lower end a head 94 which may serve as a stop to arrest the bed 90 when said bed is in its initial position. The bed 90 may be depressed against the force of the spring 91 to any extent required for banding the bills 43, the downward pressure of the bed 90 being effected by the depression of the platen or presser 95 against the bundle of bills 43 (Fig. 5). The bed 90 has downwardly extending flanges 96, lending stability to the bed and serving to aid in guiding the same, and these flanges 96 are recessed vertically to guide on vertical rib portions 97 on the front and rear walls of said box-like portion 27. The box-like portion 27 is open at one end, as at 98 (Fig. 1), so as to expose an end portion 99 of the bed 90, this being for convenience in applying the bundle of bills 43 to and removing the same from the machine. The upper surface of the bed 90 curves downwardly so that the bed in effect forms a concave trough open at both ends, but in effect closed at one end by the end 29 of the box-like portion 27 and also by a plate 100, which is fastened by screws 101 (Fig. 7) upon the upper edge of the said end 29. The plate 100 is bent at a right angle at its lower edge so as to set squarely upon the upper edge of the end wall 29, and said plate 100 serves as a gage against which one end of the bundle of bills 43 may be placed when said bills are applied to the bed plate 90. The bed plate 90 is also equipped at its front and rear edges with upwardly extending plates 102 and 103, respectively, between which the bills 43 are placed. The plates 102 and 103 are omitted in the path of the strip of paper so that said strip may be fed transversely across the box-like portion 27 and over the bed 90. The machine is provided forwardly of the cutting blade 80 with a feed table section 104 leading to the bed 90 for the bills 43, and the strip of paper when severed by the cutters lies on said table section 104 and on a narrow table section 105 fastened upon the front wall 30 of the box-like frame 27 (Fig. 5).

Pivotally secured in a recess 106 in the rear wall of the box-frame 27 on a pin 107 is a folder-plate 108, and upon the pin 107 is applied a coiled spring 109, which presses against the plate 108 and tends to automatically move said plate to its horizontal position, shown in Fig. 15, when the bed-plate 90 is moved downwardly to permit that result. In a recess in the front wall of the box-frame 27 and upon a pin 110 is pivotally mounted a folder-plate 111, and upon the pin 110 is applied a coiled spring 112 acting to automatically turn the plate 111 inwardly and downwardly when the bed 90 is moved downwardly to permit said plate 111 to be turned inwardly above the edge thereof. The folder plates 108 and 111 substantially correspond with each other and they in length are about equal to the width of the strip of paper and their purpose is when a definite length of the paper strip has been fed across the box-frame 27 and the bundle of bills 43 has been placed thereon and the bed 90 then depressed by the platen or presser 95, to turn inwardly toward each other and fold the ends of the strip across the top of said platen preparatory to the overlapping ends of the strip being secured together. The plates 108 and 111 perform no duty, except to fold the ends of the severed length of paper over upon the platen 95, the bills being below the platen and the middle portion of the length of paper being below the edges of the bills. One of the plates 108 and 111 should act in advance of the other, so that the ends of the strip of paper may be properly overlapped, and in the present instance I provide that the plate 108 shall act in advance of the plate 111, this action being attained by having the pivot point of the plate 108 on a slightly higher plane than the pivot point of the plate 111. The platen 95 has at its front edge a pin 113 which on the depression of the platen rides down against the surface of the then vertical plate 111 and does not permit said plate to fold inwardly until said pin has passed to the lower edge of the plate and released the same. When the bundle of bills is placed on the length of paper extending across the bed 90 and the platen 95 is caused to descend against the bills and push the bed 90 downwardly, the side surfaces of the box-frame 27 will turn the ends of the severed length of paper into vertical position before the plates 108 and 111 operate, and thereupon as the bed 90 continues to descend under the pressure of the platen 95, the plates 108 and 111 become released to act against the then vertical portions of the length of paper, and hence may fold said portions toward each other and upon the top of the platen. The two overlapping ends of the strip of paper are, while the bed plate 90 and platen 95 are in their lower position, secured together by the means hereinafter described, and thereupon the platen 95 is caused to ascend from the bed-plate 90, the bundle of bills moving upwardly with the platen, being held against the lower surface thereof by the band; the bed 90 will automatically assume its upper position under the action of the spring 91. The upward movement of the bed 90 against the plates 108 and 111 will turn said plates to their initial vertical position.

The platen 95 has a substantially flat top and a convex bottom conforming to the concave upper surface of the bed 90 and said platen is fastened at one edge to the front end of an arm 114 by means of screws 115, the rear end of said arm being swiveled on a stud 116 connected with the side of the frame of the machine. The arm 114 has reasonably near its rear end, a yoke 117 fastened to it, and this yoke at its upper end carries a small roller 118 and said arm at its lower side is connected with the upper end of a rod 119 (Fig. 9) on which is applied a coiled spring 120, the lower end of said spring having a bearing on a bracket 121 through which the rod 119 passes and at its upper end against a collar on said rod. The roller 118 is below a cam 122 on the shaft 71 and is actuated by the handle or lever 70 during the movement of the same. The purpose of the cam 122 is on the forward throw of the handle or lever 70 to depress the arm 114 and platen 95 carried thereby, said cam turning forwardly against the roller 118 and effecting the depression of the arm 114 and maintaining said arm depressed until the handle or lever 70 is turned rearwardly and has about reached the middle of its extent of rearward movement. The spring 120 serves to keep the arm 114 and platen 95 in their upper position, except when the force of said spring is overcome by the cam 122. The cam 122 starts the arm 114 downwardly just prior to the severing of the length of paper by the cutting blade 80, but said arm 114 is not pressed to its lowest position until after the length of paper has been severed. The arm 114 and platen 95 always move downwardly to the same extent, whether the bundle of bills should be of one thickness or another, said platen always descending to a point just below the folder plates 108, 111 or to the position shown in Fig. 15. Any variations in the thicknesses of the bundles of bills is made up by the descent of the bed 90, said bed descending under the pressure of the platen 95 to a greater or less extent according to the thickness of the bundle of bills to be banded. An adjustable stop, as a screw 123 (Figs. 5 and 7), may be provided as a rest for the arm 114 when the latter is in its lower position.

Upon the end of the shaft 71 opposite to the cam 122 is secured a cam 124 and this cam is utilized to depress, at the proper time, a lever arm 125 whose rear end is pivotally mounted on a stud 226 and whose front end has secured to it mechanism having to do with the securing together of the two overlapping ends of the strip of paper, while the same are in the position shown in Fig. 12 and which mechanism is, generally speaking, inclosed within a rectangular frame 126 fastened at one side edge by screws to the arm 125. The cam 122 effects the depression of the platen 95 in advance of the action of the cam 124 against the arm 125 for depressing the frame 126 against the overlapping ends of the strip of paper, and while the cam 122 is holding the platen 95 in its depressed position, the cam 124 holds the frame 126 in its depressed position on top of the overlapping ends of the length of paper extending across the platen, and thereupon the handle or lever 70 acts to operate the punching mechanism by which the two ends of the strip are secured together, the handle or lever 70 then bearing directly upon the upper end of the plunger 127, as shown in Fig. 12, and the further downward and forward movement of said handle or lever 70 resulting in said plunger being depressed to the position shown in Fig. 15 and carrying its operative mechanism through the overlapping ends of the strip of paper and into chambers or holes 128 provided in the platen 95 to receive them. The lever arm 125 has connected with it a spring 129 which acts to keep said arm pressed upwardly, and hence when the handle or lever 70 is again turned rearwardly and relieves the cam 124 from the arm 125, said spring will move said arm and the parts carried by it to their upper position. The arm 125 carries a stop pin 130, which, when the arm is turned to its lower position, engages the rear wall of the box-frame 27.

When the plunger 127 is depressed from the position in which it is shown in Fig. 12 to that in which it is illustrated in Fig. 15, its punch mechanism hereinafter described will effect the securing together of the overlapping ends of the band then transversely encompassing the bundle of bills and platen 95, and such downward movement of the plunger will be in opposition to the force of the spring 131, which spring when the handle or lever 70 is turned upwardly from the plunger 127 will restore said plunger and the parts carried thereby to their upper position. In this instance I secure the overlapping ends of the band together by means of two tongues 132 (Figs. 6 and 8) formed from the overlapping ends of the strip of paper encompassing, as a band, the bundle of bills and platen 95. The tongues 132 are not only cut from the overlapping ends of the paper band, but are tucked through slits 133 in said band so that the latter may be effectually secured upon the bills. The plunger 127 carries two cutters 134 for cutting the tongues 132 and also carries two slitters or vertically disposed flat needles 135 for forming the slits 133 in the paper band, said slitters being formed in their lower portions with eyes 136 through which, by means of folders 137, the end portions of the cut tongues 132 are inserted, while the plunger 127 is in its lower position, shown in Fig. 15, preparatory to said slitters or flat needles 135 drawing said tongues upwardly through the slits 133 or to the position shown in Fig. 6 for securing the two ends of the band together.

In Fig. 12 I illustrate the plunger 127 in one position directly over the overlapping ends of the paper band, and in Fig. 15 I illustrate the extreme lower position of the plunger, the cutters 134 having cut through the overlapping ends of the paper band, the slitters or needles 135 having passed downwardly through said overlapping ends to form the slits 133 and the folders 137 having tucked the free ends of the tongues 132 through the eyes 136 of the slitters or needles 135. Thereafter when the lever or handle 70 is elevated and the plunger 127 is permitted to elevate, the free ends of the tongues 132 are by means of the needles or slitters 135 drawn upwardly through the slits 133. Upon the lower portion of the plunger 127 is secured a frame 138 (Fig. 16) by means of a screw 139 passing through a vertically elongated slot 140 in said frame and entering the front face of the plunger 127. The frame 138 has front and rear sides connected by end pieces 141 whereby a substantially vertical rectangular frame is formed encompassing the lower portion of the plunger 127. The frame 138 also has a bottom plate 142 containing openings 143, 144, respectively, (Fig. 14) for the tongue cutters 134 and slitters 135, the openings for the cutters 134 closely conforming to the outline of said cutters, and the openings 144 for the slitters 135 being somewhat free from the side surfaces of said slitters. Interposed between the top of the bottom plate 142 of the frame 138 and the lower end of the plunger 127 is a coiled spring 145 which exerts its force oppositely against the plunger 127 and frame 138. When the plunger 127 with the frame 138 is depressed against the platen 95, the lower end of the frame 138 first reaches the upper surface of the platen and then the plunger proper, 127, passes downwardly within the frame 138 so that its tongue cutters 134, slitters 135 and folders 137 may extend through the overlapping ends of the band of paper and pass within the chambers 128 of the platen or to the position shown in Fig. 15, and when the plunger 127 is relieved by the upwardly turning of the handle or lever 70, the spring 131 first moves the body of the plunger 127 upwardly and at this time the spring 145 acting against the bottom of the frame 138 retards the upward movement of said frame so as to assure the correct operation of the slitters or needles 135 and avoid any violent action of the securing mechanism which might tend to tear the paper band or otherwise detract from the successful operation of the machine. Above the vertical holes or recesses 128 in the platen 95 I secure a steel die plate 146 (Fig. 13) to coöperate with the cutters 134, and as may be seen in Fig. 13 I bevel off, as at 147, the plate 146 at the broader ends of the holes 148 formed therein to receive the cutters or punches 134, and this beveling off of the plate 146 at the edge of the openings therein, as at 147, is to permit the convenient withdrawal from off the platen 95 of the bundle of bills and the band encompassing the same. The tucking in of the tongues 132 through the slits 133 results in there being an increased thickness of the paper at the underside of the overlapping ends of the band, and this increased thickness lies within the outline of the openings 148 in the die plate 146, and consequently in the absence of the beveled portions 147 there would be danger of the increased thickness at the points to which I have referred interfering with the ready removal of the bands laterally from the platen 95.

I provide one side of the main plunger frame 126 with a stop arm 149 (Fig. 16) which when in its lower position will engage the upper surface of the platen 95 adjacent to the platen carrying arm 114, and from that time on the platen and main frame 126 will have a fixed relation to each other, while during the continued downward movement of the lever or handle 70 the plunger 127 and parts connected with it may perform their duty.

Upon the front of the plunger 127 I secure the dating mechanism 150 of known type consisting of rubber bands mounted on rollers and adapted to be independently set in accordance with the date to be printed, the frame of said mechanism 150 having hinged to its lower end an inked pad-carrying-holder 151 which normally remains in the closed position shown in Fig. 12, but upon the descent of the plunger 127 turns downwardly and rearwardly from the lower ends of the printing belts so that said ends may impress upon the band then at the upper side of the platen 95 the date of the banding of the bills or such other data as it may be deemed desirable to print on the bands. The pad holder 151 is secured on a pin 158 carried by the arms 141 of the supplemental or auxiliary frame 138 and a spring 159 (Fig 14) serves to normally hold said holder 151 in position against the lower ends of the type-belts and to restore said holder to such position when the printing devices are elevated from the band of paper. Upon the side of the frame of the printing devices 150 is secured a substantially vertical arm 160 (Fig. 2) having a lower laterally turned end which, upon the depression of the plunger within the auxiliary or supplemental frame 138 engages the edge of the holder 151 and turns said holder downwardly and rearwardly out of the way so that the type-belts of the printing mechanism may directly engage the band extending across the top of the platen 95.

The operation of the machine will be substantially fully understood from the detailed description hereinbefore presented, and hence it will be unnecessary to refer in specific detail to the various features of construction and operation. I have shown the handle or lever 70 by which the entire operation of the machine is carried on, as intended for manual operation, but I do not desire to limit myself to the operating of the machine manually, since a motor may be easily applied for operating the same. The strip of paper from a reel 42 is fed beyond the cutters and across the top of the bed 90 when the latter is in its upper position on each rear stroke of the handle or lever 70, and this portion of the strip of paper extending beyond the cutters is amply sufficient for the banding of any usual bundle of bills, checks or the like. After each feeding of the paper across the top of the bed 90 on the rear stroke of the handle or lever 70, the bundle of bills or the like is placed on the strip of paper extending across the bed 90 and upon said bed, and thereafter the lever or handle 70 is turned forwardly to effect the cutting off of the length of strip for the band from the main strip, for depressing the platen or presser 95 against the bundle of bills resting on the strip of paper and against the bed 90, for depressing said bed so that the folders 108 and 111 may, one after another, turn the respective ends of the strip of paper for the band over upon the top of the platen 95 and finally for depressing the tongue cutting and dating mechanisms carried by the arm 125 so as to effect the securing of the overlapped ends of the band together and dating of the band.

After the band has been secured around the bundle of bills and platen 95 and the handle or lever arm 70 is turned rearwardly so as to permit the elevation of the platen 95 carrying the bills hung to its lower surface, the bundle of bills is withdrawn laterally of the machine from off the platen and transversely flattened out to remove the concavity therein formed by the bed 90 and platen 95, the band then closely binding the bundle and all slackness therein taken up. The bundles of bills are one after another banded by the machine of my invention with considerable rapidity and the ends of the bands are secured without the use of pins or metal fasteners of any kind or of any substance, as mucilage, foreign to the paper of the band itself. The form of the platen 95 and bed 90 enables me to fasten the overlapping ends of the paper band by the tongues 132 and slits 133 and at the same time to apply to the banding only that length of strip required to snugly hold the bundle of bills when the same is flattened out. I have hereinbefore explained that the carriage 38 is laterally slidable so that reels of paper 42 varying in color and in the notations that may be printed thereon may be moved to operative position in line with the feed rollers 57, 58 and that the carriage may be locked in any set position by means of the finger 50 and recesses 47. I provide the ends of one of the track rails 35 with screws, as shown in Fig. 7, so that the carriage 38 may not through accident slip from off the rails during the hand manipulation of the carriage in shifting the same to bring any special reel 42 in line with the feed rollers 57, 58.

I do not limit my invention to the employment for securing the overlapping ends of the band of paper, of two tongues and slits therefor since for thin bundles one tongue and slit may be sufficient and for larger bundles I may conclude to employ more than two tongues and slits, nor is my invention in every instance limited to any special tongues and slits for securing the overlapping ends of the band together, although I have described hereinbefore and illustrated in the accompanying drawings the preferred character of tongues and slits for locking the two overlapping ends of the band together.

I believe I am the first person to discover a way of fastening the two overlapping ends of the band around a bundle of bills or the like by interlocking tongues and slits formed in said ends by mechanical means during the banding operation and regardless of the thickness, within reason, of the bundle of bills or the like to be banded.

I do not limit my invention in every instance to any special means for or method of fastening the overlapping ends of the band together on the outer face of the presser or platen.

I have presented herein the best form of the invention both in its details and general features known to me, but I do not desire to limit my invention to the structural forms and details described since I am aware that without departing from my invention my machine may be modified in many ways within the scope of the appended claims.

What I claim as my invention and desire to secure by Letters Patent, is:

1. In a banding machine of the character described, a bed having a concave face transversely across which a banding strip may be extended and against which strip and bed a bundle of bills to be banded may be placed, a presser or platen having a convex face to engage said bundle and an outer face upon which the end portions of said strip may be folded in overlapping relation and secured together, and means for moving said presser or platen forcibly against said bundle of bills to concave the same preparatory to the ends of the strip being secured together on the outer face of said presser or platen, whereby when the bundle is removed from the presser or platen and flattened out it closely fills the band upon it.

2. In a banding machine of the character described, a bed having a concave face, means for feeding a banding strip transversely across said face and against which strip and bed a bundle of bills to be banded may be placed, a presser or platen having a convex face to engage said bundle and an outer face upon which the end portions of said strip may be folded in overlapping relation and secured together, and means for moving said presser or platen forcibly against said bundle of bills to concave the same preparatory to the ends of the strip being secured together on the outer face of said presser or platen, whereby when the bundle is removed from the presser or platen and flattened out it closely fills the band upon it.

3. In a banding machine of the character described, a bed having a concave face transversely across which a banding strip may be extended and against which strip and bed a bundle of bills to be banded may be placed, a presser or platen having a convex face to engage said bundle and an outer face upon which the end portions of said strip may be folded in overlapping relation and secured together, means for moving said presser or platen forcibly against said bundle of bills to concave the same, and means for then folding the end portions of said strip upon the outer face of said presser or platen preparatory to said ends being secured together thereon, whereby when the bundle is removed from the presser or platen and flattened out it closely fills the band upon it.

4. In a banding machine of the character described, a bed having a concave face transversely across which a banding strip may be extended and against which strip and bed a bundle of bills to be banded may be placed, a presser or platen having a convex face to engage said bundle and an outer face upon which the end portions of said strip may be folded in overlapping relation and secured together, means for moving said presser or platen forcibly against said bundle of bills to concave the same, means for then folding the end portions of said strip upon the outer face of said presser or platen, and means for securing said end portions of the strip together while on said outer face of said presser or platen, whereby when the bundle is removed from the presser or platen and flattened out is closely fills the band upon it.

5. In a banding machine of the character described, a yielding bed transversely across which a banding strip may be extended and against which strip and bed a bundle of bills to be banded may be placed, a presser or platen having one face to engage said bundle and an outer face upon which the end portions of said strip may be folded and secured together, means for moving said presser or platen forcibly against said bundle of bills and to depress said bed according to the thickness of the bundle, means on the depression of said bed for turning the end portions of the strip upwardly, and means for folding the end portions of the strip in overlapping relation upon the outer face of said presser or platen preparatory to said ends being secured together thereon.

6. In a banding machine of the character described, a yielding bed, means for feeding a banding strip transversely across said bed and against which strip and bed a bundle of bills to be banded may be placed, a presser or platen having one face to engage said bundle and an outer face upon which the end portions of said strip may be folded and secured together, means for moving said presser or platen forcibly against said bundle of bills and to depress said bed according to the thickness of the bundle, means on the depression of said bed for turning the end portions of the strip upwardly, and means for folding the end portions of the strip in overlapping relation upon the outer face of said presser or platen preparatory to said ends being secured together thereon.

7. In a banding machine of the character described, a yielding bed across which a banding strip may be extended and against which strip and bed a bundle of bills to be banded may be placed, a presser or platen to engage said bundle having an outer surface upon which the ends of said strip may be folded and which presser is adapted to depress said bed to an extent governed by the thickness of the bundle, and means for securing said ends of the strip together while on said presser, said bed and presser having opposed surfaces adapted to concave said bundle preparatory to the ends of the strip being secured together.

8. In a banding machine of the character described, a bed across which a banding strip may be extended and against which strip and bed a bundle of bills to be banded may be placed, a spring yieldingly supporting said bed and serving to return it when depressed to its normal position, means for arresting the bed at its normal position, a presser or platen to engage said bundle having an outer surface upon which the ends of said strip may be folded and which presser is adapted to depress said bed to an extent governed by the thickness of the bundle, and means for securing said ends of the strip together while on said presser, said bed and presser having opposed surfaces adapted to concave said bundle preparatory to the ends of the strip being secured together.

9. In a banding machine of the character described, a yielding bed across which a banding strip may be extended and against which strip and bed a bundle of bills to be banded may be placed, a presser or platen to engage said bundle having an outer surface upon which the ends of said strip may be folded and which presser is adapted to depress said bed to an extent governed by the thickness of the bundle, means for arresting said presser in predetermined position when depressed so that variations in the thickness of the bundles of bills may be taken up by the yielding of the bed, and means for securing said ends of the strip together while on said presser, said bed and presser having opposed surfaces adapted to concave said bundle preparatory to the ends of the strip being secured together.

10. In a banding machine of the character described, a yielding bed across which a banding strip may be extended and against which strip and bed a bundle of bills to be banded may be placed, a presser or platen to engage said bundle having an outer surface upon which the ends of said strip may be folded and which presser is adapted to depress said bed to an extent governed by the thickness of the bundle, means for folding the end portions of said strip upon said presser when the latter is in its lower position, and means for securing said ends of the strip together while on said presser, said bed and presser having opposed surfaces adapted to concave said bundle preparatory to the ends of the strip being secured together.

11. In a banding machine of the character described, a yielding bed across which a banding strip may be extended and against which strip and bed a bundle of bills to be banded may be placed, a presser or platen to engage said bundle having an outer surface upon which the ends of said strip may be folded and which presser is adapted to depress said bed to an extent governed by the thickness of the bundle, means for folding the end portions of said strip, one end after another, upon said presser in overlapping relation when said presser is in its lower position, and means for securing said overlapping ends of the strip together while on said presser, said bed and presser having opposed surfaces adapted to concave said bundle preparatory to the ends of the band being secured together.

12. In a banding machine of the character described, a yielding bed across which a banding strip may be extended and against which strip and bed a bundle of bills to be banded may be placed, a presser or platen to engage said bundle having an outer surface upon which the ends of said strip may be folded and which presser is adapted to depress said bed to an extent governed by the thickness of the bundle, folders at opposite edges of the bed operable on the depression of the bed and presser below them to fold the end portions of the strip, one after another, toward each other and upon the presser, and means for securing said ends of the strip together while on said presser, said bed and presser having opposed surfaces adapted to concave said bundle preparatory to the ends of the strip being secured together.

13. In a banding machine of the character described, a yielding bed across which a banding strip may be extended and against which strip and bed a bundle of bills to be banded may be placed, a presser or platen to engage said bundle having an outer surface upon which the ends of said strip may be folded and which presser is adapted to depress said bed to an extent governed by the thickness of the bundle, pivotally mounted folders at opposite edges of the bed to, on the depression of the bed and presser below them, fold the end portions of the strip, one after another, toward each other upon the presser, springs flexed against said folders to turn them toward each other and against the end portions of the strip on the depression of the bed and presser below them, and means for securing said ends of the strip together while on said presser, said bed and presser having opposed surfaces adapted to concave said bundle preparatory to the ends of the strip being secured together.

14. In a banding machine of the character described, a bed, means for feeding a banding strip across said bed and against which strip and bed a bundle of bills to be banded may be placed, a presser or platen to engage said bundle having an outer surface upon which the ends of said strip may be folded, means for folding the end portions of said strip upon said presser, and means for securing said ends of the strip together while on said presser, said bed and presser having opposed surfaces adapted to concave said bundle preparatory to the ends of the band being secured together.

15. In a banding machine of the character described, a bed, means for feeding a banding strip from a reel across said bed and against which said strip and bed a bundle of bills to be banded may be placed, means for severing a definite length from the strip for a band, a presser or platen to engage said bundle having an outer surface upon which the end portions of said length may be folded, means for folding the end portions of the severed strip, one after another in overlapping relation, upon said presser, and means for securing the overlapping ends of the strip together while on said presser, said bed and presser having opposed surfaces adapted to concave said bundle preparatory to the ends of the band being secured together.

16. In a banding machine of the character described, a yielding bed, means for feeding a banding strip from a reel across said bed and against which said strip and bed a bundle of bills to be banded, may be placed, means for severing a definite length of the strip for a band, a presser or platen to engage said bundle having an outer surface upon which the ends of the severed strip may be folded and which presser is adapted to depress said bed to an extent governed by the thickness of the bundle, folders at opposite edges of said bed for folding the end portions of said strip upon said presser, and means for securing said ends of the strip together while on said presser, said bed and presser having opposed surfaces adapted to concave said bundle preparatory to the ends of the strip being secured together.

17. In a banding machine of the character described, a bed across which a banding strip may be extended and against which strip and bed a bundle of bills to be banded may be placed, a presser or platen to engage said bundle having an outer surface upon which the ends of said strip may be folded and also a chamber below the overlapping ends of the strip when folded, and means for securing said ends of the strip together while on said presser comprising a cutter to cut through the overlapping ends of the strip and form a tongue therefrom, a slitter to slit said ends of the strip in near relation to said tongue and having an eye, a folder to turn the end of the tongue through the eye of the slitter, means for depressing the cutter and slitter into the chamber of said presser and means for elevating the cutter and slitter from the presser, said bed and presser having opposed surfaces adapted to concave said bundle preparatory to the ends of the strip being secured together.

18. In a banding machine of the character described, a bed, means for feeding a banding strip across said bed and against which strip and bed a bundle of bills to be banded may be placed, a presser or platen to engage said bundle having an outer surface upon which the ends of said strip may be folded and also a chamber below the overlapping ends of the strip when folded, and means for securing said ends of the strip together while on said presser comprising a cutter to cut through the overlapping ends of the strip and form a tongue therefrom, a slitter to slit the ends of the strip in near relation to said tongue and having an eye, a folder to turn the end of the tongue through the eye of the slitter, means for depressing the cutter and slitter into the chamber of said presser and means for elevating the cutter and slitter from the presser, said bed and presser having opposed surfaces adapted to concave said bundle preparatory to the ends of the strip being secured together.

19. In a banding machine of the character described, a bed, means for feeding a banding strip from a reel across said bed and against which strip and bed a bundle of bills to be banded may be placed, means for severing a definite length from the strip for a band, a presser or platen to engage said bundle having an outer surface upon which the ends of the severed strip may be folded and also a chamber below the overlapping ends of the strip when folded, and means for securing said ends of the strip together while on said presser comprising a cutter to cut through the overlapping ends of the strip and form a tongue therefrom, a slitter to slit said ends of the strip in near relation to said tongue and having an eye, a folder to turn the end of the tongue through the eye of the slitter, means for depressing the cutter and slitter into the chamber of said presser and means for elevating the cutter and slitter from the presser, said bed and presser having opposed surfaces adapted to concave said bundle preparatory to the ends of the strip being secured together.

20. In a banding machine of the character described, a bed, means for feeding a banding strip from a reel across said bed and against which strip and bed a bundle of bills to be banded may be placed, means for severing a definite length of a strip for a band, a presser or platen to engage said bundle and having an outer surface upon which the ends of said strip may be folded and also a chamber below the overlapping ends of the strip when folded, means at opposite edges of said bed for folding the end portions of said strip, one after another, upon said presser in overlapping relation, and means for securing said ends of the strip together while on said presser comprising a cutter to cut through the overlapping ends of the strip and form a tongue therefrom, a slitter to slit the ends of the strip in near relation to said tongue and having an eye, a folder to turn the end of the tongue through the eye of the slitter, means for depressing the cutter and slitter into the chamber of said presser and means for elevating the cutter and slitter from the presser, said bed and presser having opposed surfaces adapted to concave said bundle preparatory to the ends of the strip being secured together.

21. In a banding machine of the character described, a yielding bed across which a banding strip may be extended and against which strip and bed a bundle of bills to be banded may be placed, a presser or platen to engage said bundle having an outer surface upon which the ends of said strip may be folded and also a chamber below the overlapping ends of the strip when folded and which presser is adapted to depress said bed to an extent governed by the thickness of the bundle, and means for securing said ends of the strip together while on said presser comprising a cutter to cut through the overlapping ends of the strip and form a tongue therefrom, a slitter to slit the ends of the strip in near relation to said tongue and having an eye, a folder to turn the end of the tongue through the eye of the slitter, means for depressing the cutter and slitter into the chamber of said presser and means for elevating the cutter and slitter from the presser, said bed and presser having opposed surfaces adapted to concave said bundle preparatory to the ends of the strip being secured together.

22. In a banding machine of the character described, a yielding bed across which a banding strip may be extended and against which strip and bed a bundle of bills to be banded may be placed, a presser or platen to engage said bundle having an outer surface upon which the ends of said strip may be folded in overlapping relation and also a chamber below the overlapping ends of the strip when folded and which presser is adapted to depress said bed to an extent governed by the thickness of the bundle, means for arresting said presser in predetermined position when depressed so that variations in thickness of the bundle of bills may be taken up by the yielding of the bed, and means for securing said ends of the strip together while on said presser comprising a cutter to cut through the overlapping ends of the strip and form a tongue therefrom, a slitter to slit the ends of the strip in near relation to said tongue and having an eye, a folder to turn the end of the tongue through the eye of the slitter, means for depressing the cutter and slitter into the chamber of said presser and means for elevating the cutter and slitter from the presser, said bed and presser having opposed surfaces adapted to concave said bundle preparatory to the ends of the strip being secured together.

23. In a banding machine of the character described, a bed, means for feeding a banding strip across said bed and against which strip and bed a bundle of bills to be banded may be placed, and a presser or platen to engage said bundle having an outer surface upon which the ends of said strip may be folded and secured together, said bed and presser having opposed surfaces adapted to concave said bundle preparatory to the ends of the strip being secured together.

24. In a banding machine of the character described, a bed, means for feeding a banding strip from a reel across said bed and against which said strip and bed a bundle of bills to be banded may be placed, means for severing a definite length of the strip for a band, and a presser or platen to engage said bundle and having an outer surface upon which said severed strip may have its ends folded and be secured together, said bed and presser having opposed surfaces adapted to concave said bundle preparatory to the ends of the strip being secured together.

25. In a banding machine of the character described, a bed, means for feeding a banding strip from a reel across said bed and against which strip and bed a bundle of bills to be banded may be placed, means for severing a definite length from the strip for a band, and a presser or platen to engage said bundle having an outer surface upon which said severed strip may be folded and have its end portions secured together.

26. In a banding machine of the character described, a bed across which a banding strip may be extended and against which strip and bed a bundle of bills to be banded may be placed, a presser or platen to engage said bundle having an outer surface upon which the ends of said strip may be folded and secured together, and means for folding the end portions of said strip upon said presser preparatory to the securing together of said end portions.

27. In a banding machine of the character described, a bed across which a banding strip may be extended and against which strip and bed a bundle of bills to be banded may be placed, a presser or platen to engage said bundle having an outer surface upon which the ends of said strip may be folded, means for folding the end portions of said strip upon said presser, means for securing said end portions of the strip together while on said presser, and means for applying a date on said strip while on said presser.

28. In a banding machine of the character described, a bed across which a banding strip may extend and against which strip and bed a bundle of bills to be banded may be placed, a transversely adjustable carriage subdivided by compartments for holding strips of banding paper varying in character, means for feeding the end portion of any one of the strips across said bed, means for severing a definite length of the strip from the main body thereof for a band, means for locking said carriage in adjusted position with one of the strips of paper in line with said feeding means, and a presser or platen to engage said bundle having an outer surface upon which the severed length of strip may be folded and have its end portions secured together.

29. In a banding machine of the character described, a bed across which a banding strip may be extended and against which strip and bed a bundle of bills to be banded may be placed, a presser or platen to engage said bundle having an outer surface upon which the ends of said strip may be folded and also a chamber below the overlapping ends of the strip when folded, and means for securing said ends of the strip together while on said presser comprising a cutter to cut through the overlapping ends of the strip and form a tongue therefrom, a slitter to slit said ends of the strip in near relation to said tongue and having an eye, a folder to turn the end of the tongue through the eye of the slitter, means for depressing the cutter and slitter into the chamber of said presser and means for elevating the cutter and slitter from the presser, said bed and presser having opposed surfaces adapted to concave said bundle preparatory to the ends of the strip being secured together, said chamber being adapted to receive said cutter with reasonable snugness and the edge of the platen and entrance to said chamber being recessed at one side to permit of the ready withdrawal of the banded bundle from the presser or platen by a lateral movement.

Signed at New York city, in the county of New York and State of New York, this 22nd day of April A. D. 1915.

CHARLES S. BATDORF.

Witnesses:
ARTHUR MARION,
CHAS. C. GILL.